United States Patent [19]
Lencioni, Jr.

[11] 3,859,988
[45] Jan. 14, 1975

[54] OPEN LEAD TESTING SYSTEM FOR EEG
[75] Inventor: Cecil C. Lencioni, Jr., Chicago, Ill.
[73] Assignee: Beckman Instruments, Inc., Fullerton, Calif.
[22] Filed: Apr. 30, 1973
[21] Appl. No.: 355,768

[52] U.S. Cl. .............................. 128/2.1 B, 324/51
[51] Int. Cl............................................. A61b 5/04
[58] Field of Search........ 128/2.06 B, 2.06 R, 2.1 B, 128/2.1 R; 324/51

[56] References Cited
UNITED STATES PATENTS
2,933,364 4/1960 Campbell ......................... 128/2.1 B
3,699,432 10/1972 Brown................................... 324/51
3,732,859 5/1973 Tateno ............................ 128/2.1 B

*Primary Examiner*—William E. Kamm
*Attorney, Agent, or Firm*—R. J. Steinmeyer; James M. Thomson

[57] ABSTRACT

A system for continuous monitoring for open circuits in multiple lead EEG systems during patient testing. Means are provided for repetitively applying a low current signal, having a distinctive waveform and frequency, to each electrode of the system. In the event an electrode is detached from the patient's scalp or otherwise open, the distinctive signal is apparent in the recorded output. Otherwise the distinctive signal is of such low magnitude that it is below the signal-to-noise ratio of the EEG amplifier. In systems including multiple leads, the test signal is successively applied to each electrode in the system in a time-controlled sequence. In one preferred embodiment a distinctive signal is used comprising a four pulse burst of 25 Hz frequency.

5 Claims, 3 Drawing Figures

OPEN LEAD TESTING SYSTEM FOR EEG

BACKGROUND OF THE INVENTION

The present invention relates to a test system for identifying open leads in EEG testing. More particularly, the invention relates to a system for applying a distinctive test signal to each electrode of a multiple lead EEG system for detecting open circuits which may occur during a patient run.

EEG systems are widely used in the medical field, with the usual system including multiple leads that are secured to the scalp and/or other extremities of the patient to pick up electrical signals therefrom. In such testing it is possible for electrodes to become detached from the scalp during the test run. However, due to the low magnitude signals which are being recorded, the recorded output may appear to be normal even with such electrodes open. Thus, an undetected open circuit condition can lead to serious errors in interpretation of the patient record.

More specifically, when an electrode opens, the noise level of the amplifer increases due to the high source impedance presented to the amplifier with an open input. In addition, when the amplifiers are connected in multiple chains, it is possible for the voltage generated by the other electrodes in the system to divide among the amplifiers according to amplifier input impedance, whereby voltages from the other electrodes may appear at the input of the amplifier associated with the open electrode. Further, under some recording conditions, the open lead input may assume a ground or reference potential giving a monopolar recording rather than the differential input expected. Thus, a normally appearing record may be associated with an open electrode, due to either amplifier noise, ground referenced recording or voltage summing with other intact electrodes.

In conventional EEG usage, it is usual to perform an electrode impedance test on each electrode before an EEG run. This test, however, does not identify electrodes which become high or open during the EEG run.

SUMMARY OF THE INVENTION

Accordingly, it is an object of the invention to provide an open circuit or open lead testing system for use with EEG systems, which overcomes the disadvantages mentioned hereinbefore.

It is another object of the invention to provide an open lead testing system wherein a distinctive test signal is repetitively applied to each electrode of the EEG, at predetermined interval during a given test run, which test signal produces an identifiable trace in the recording only in the event that an electrode is open circuited.

It is another object of the invention to provide such an open lead testing system wherein the test signals are applied to the electrodes in the system at different times, in a time-controlled sequence, so that signals from two open electrodes connected to the same amplifier will not cancel due to the common mode rejection characteristics of the amplifier.

It is yet a further object of the invention to provide such an open lead testing system wherein a distinctive test waveform comprising a group of four pulses is applied to each electrode in turn, which pulses appear in the recorded output as a distinctive recorded pattern in the event a given electrode is open.

These and other objects are attained in a system which includes a free-running multivibrator for generating a square wave pulse, a binary counter, a decade counter and logic circuit means connected with the multivibrator to provide test signals comprising time sequenced signals of distinctive form. The time sequenced signals of distinctive form are repetitively applied to each electrode of the system, with the binary counter and the decade counter determining the time sequence in which each electrode receives the test signal. The amplituide of the test signal current is selected to be sufficiently small that the voltage developed across an electrode of normal impedance is below the noise level of the amplifier, but large enough so that an open electrode produces a clear indication on the recorded chart. The distinctive form of the test signal is such that it will not likely be mistaken for an EEG signal when it appears in the recorded output.

BRIEF DESCRIPTION OF THE DRAWINGS

These and other features and advantages of the invention will become apparent from the following detailed description taken in conjunction with the accompanying drawings wherein.

DETAILED DESCRIPTION OF THE INVENTION

Figure 1:
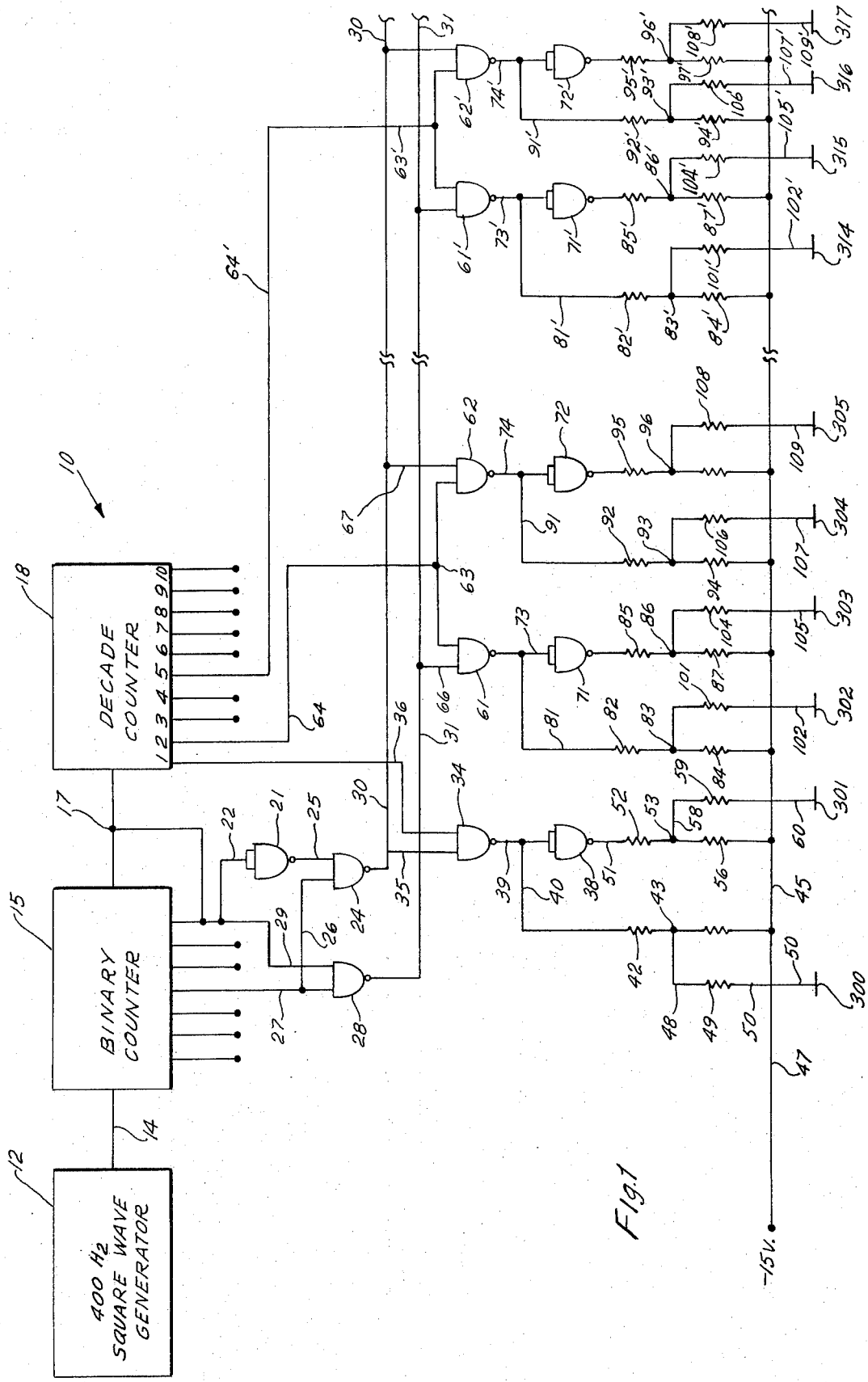
FIG. 1 is an electrical schematic diagram of one embodiment of the invention.

Referring now to FIG. 1, an open lead test system 10 is generally illustrated in conjunction with an EEG system having multiple electrode leads 300–317. Each conventional EEG electrode would normally be connected to the scalp of a patient, in the usual fashion, and electrically interconnected with an appropriate amplifier of a conventional EEG system, not illustrated. The test system described hereinafter is adapted to accommodate EEG systems having as many as 40 electrodes. However, if desired, the number of electrodes handled by the test circuit could be increased by employing a binary counter and decade counter of greater capacity than those utilized in the system illustrated in FIG. 1, as will be explained hereinafter.

Test system 10 includes a square wave generator 12 having its output electrically connected to the input of a binary counter 15 by a conductor 14, and a decade counter 18 having its input electrically interconnected with the binary counter by a conductor 17.

The square wave generator is of conventional design and provides a 400 Hz square wave output. Binary counter 15 is a seven stage binary counter, such as a counter commerically available as type CD4024. The type CD4024 counter provides an output for each stage and consists of an input shaping circuit, a reset line driver circuit and seven binary counter stages. The counter is reset to zero by a high level input to the reset input, and each counter stage is a static master-slave flip-flop whereby the counter stage is advanced one count on the negative-going transition of each input pulse. Consequently the output signals appearing at each of the seven output terminals of the counter are successively divided by a factor of two. The first output terminal of the counter provides a 200 Hz output signal and the other output signals from the counter are, successively, of half value. Thus, the fourth output terminal provides a 25 Hz signal and the seventh output terminal, to which conductor 17 is connected, provides a 3.125 Hz output signal. It should be apparent that any other suitable type of binary counter having seven or more stages could be utilized, if desired.

Decade counter 18 is a 10 stage counter divider of conventional design, for example a type CD4017A. The counter is advanced one count at each positive input signal transition, if the clock enable signal of the counter is low. The 10 decoded outputs are normally low and go high only at the respective decimal time slot. Each decoded output signal remains high for one full clock or input cycle. A carry out signal completes one full cycle every 10 clock or input cycles and is used to directly clock the succeeding decade in a multi-decade counting chain. Consequently, the output signals available at the 10 output terminals of the counter are single pulses staggered in time whereby one complete cycle of the counter occurs for each 10 input pulses thereto.

In the system illustrated a dual input NAND gate 21 of conventional design is provided having both its inputs electrically connected to the 3.125 Hz output of the binary counter by a conductor 22. Another dual input NAND gate 24 is provided having one input electrically connected to the output of gate 21 by a conductor 25 and having its other input electrically connected to the 25 Hz output terminal of the binary counter by conductors 26, 27.

NAND gate 28 is also provided having one input connected to the 25 Hz output of counter 15 by conductor 27 and having its other input connected to the 3.125 Hz output of the counter by a conductor 29. The output of gate 24 is connected to a conductor 30 and the output of gate 28 is electrically connected to a conductor 31. The signals appearing upon conductors 30, 31 comprise four pulse groups of 25 Hz frequency spaced at predetermined, staggered time intervals. The form of the signals or pulse trains appearing on conductors 30, 31 will be better understood when considered in conjunction with the waveforms set forth in FIG. 2 and considered hereinafter.

The system described otherwise includes a NAND gate 34 having one input connected to conductor 30 by a conductor 35 and having its other input electrically connected to the first output terminal of counter 18 by a conductor 36. NAND gate 38 is also provided, having both its inputs electrically connected to the output terminal of gate 34 by a conductor 39. A conductor 40 also electrically connects the output terminal of gate 34 to one end of a resistor 42 having its other end connected to a junction 43. Junction 43 is electrically interconnected with a −15 volt reference conductor 47 via a resistor 46. Junction 43 is also electrically connected via conductor 48, resistor 49 and conductor 50 with electrode lead 300 of the EEG system associated with system 10. The output of gate 38 is connected via a conductor 51 and resistor 52 to junction 53. Junction 53 is electrically connected via resistor 56 to reference conductor 47 and via conductor 58, resistor 59 and conductor 60 to electrode lead 301 of the EEG system.

The system otherwise includes a similar arrangement of gates associated with electrodes 302–305 of the EEG. More particularly, NAND gates 61, 62 are provided each having one input connected to a common junction 63 which is electrically connected to the No. 2 output terminal of the decade counter by a conductor 64. The other input of gate 61 is connected to conductor 31 by a conductor 66; and the other input of gate 62 is connected to conductor 30 by a conductor 67. The output of gate 61 is electrically connected to both inputs of a NAND gate 71 by a conductor 73; and the output of gate 62 is electrically connected to both inputs of a NAND gate 72 by a conductor 74. The output of gate 61 is also connected to reference conductor 47 via a conductor 81, resistor 82, junction 83 and resistor 84. In similar fashion the output of gate 62 is connected to reference conductor 47 by a conductor 91, resistor 92, junction 93 and resistor 94.

The output of gate 71 is connected to reference conductor 47 via resistor 85, junction 86 and resistor 87. The output of gate 72 is likewise connected to reference conductor 47 via a resistor 95, junction 96 and resistor 97, Junction 83 is connected to electrode lead 302 via a resistor 101 and a conductor 102. In similar fashion junction 86 is connected to electrode 303 by a resistor 104 and a conductor 105; junction 93 is connected to electrode lead 304 via resistor 106 and conductor 107; and junction 96 is connected to electrode lead 305 by a resistor 108 and conductor 109.

Similar gating arrangements are provided to interconnect output terminal 3 of counter 18 and conductors 30, 31 with electrode leads 306–309 of the EEG system and so on.

For example, output terminal 5 and conductors 30, 31 are interconnected with electrode leads 314–317 by a logic network similar to that associated with electrodes 301–305. The logic network associated with terminals 314–317 is shown on the righthand side of FIG. 1 and like primed numerals are used to designate like elements therein. It should be apparent that each of the other output terminals of counter 18 is provided with a similar logic array, associated with similar terminals.

Figure 2:
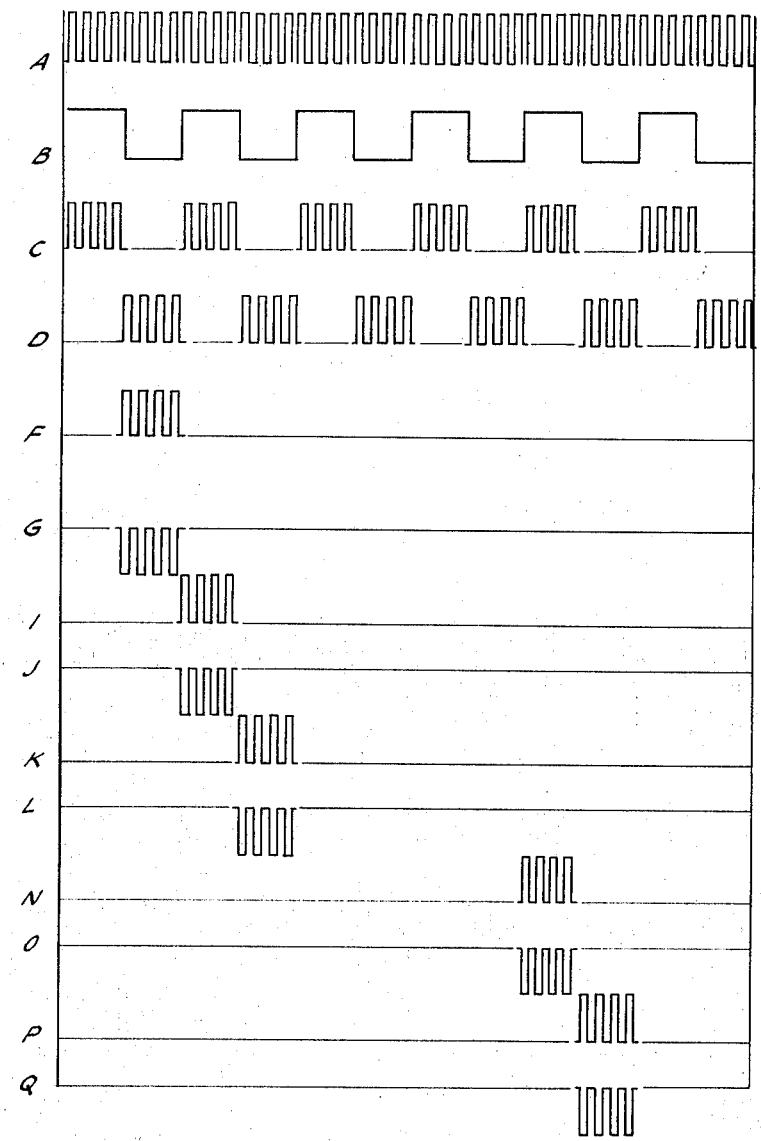
FIG. 2 is a chart illustrating various pulse waveforms that occur in the circuit disclosed in FIG. 1.

Referring now to FIG. 2, the operation of the embodiment illustrated in FIG. 1 will be apparent.

Line A of FIG. 2 illustrates a 25 Hz square wave pulse which is available from the 25 Hz output terminal of binary counter 15. The square wave pulse is applied to gate 28 and gate 24. Line B of FIG. 2 illustrates a 3.125 Hz square wave pulse which is derived from the last output terminal of counter 15, and applied to gate 28, as well as gate 21. Consequently, gate 28 is blocked during the low period of the 3.125 pulse and enabled during the high period of the 3.125 Hz pulse whereby each of the four 25 Hz pulses occurring during the enabled interval pass gate 28 and appear on conductor 31. Such a pulse train is illustrated on line C of FIG. 2.

In similar fashion, gate 21 is enabled upon the occurrence of the high level of each 3.125 Hz pulse, since its dual inputs each receive that signal. The inverted output of gate 21 is applied to one input of gate 24. Consequently, the output of gate 24 supplied to conductor 30 also comprises a periodically occurring train of four spaced pulses. However, due to the inversion of the signal via gate 21, the pulses appearing on conductor 30 are offset with respect to those appearing on conductor 31. The pulse train appearing on conductor 30 is illustrated on line D of FIG. 2.

As shown, gate 34 receives the pulse train appearing on conductor 30 at one input, and receives a pulse signal from the first output terminal of counter 18 at the other input. Accordingly, gate 34 is enabled during a time period determined by the width of the pulse appearing at the first output terminal of counter 18, and passes the pulse train occurring on conductor 30 during the enabled period. The pulse train passing gate 34 is applied directly to electrode lead 300, as shown, and in addition, is inverted by gate 38 and applied to electrode lead 301. The pulse train applied to electrode lead 300 is illustrated on line F of FIG. 2 and the pulse train applied to electrode lead 301 is illustrated on line G of FIG. 2.

In similar fashion, the output of the second terminal of counter 18 is utilized to enable gates 61, 62. During the enabled period, these gates pass a four pulse burst of the pulse trains appearing on conductors 31, 30, respectively. The output of gate 61 is applied directly to electrode lead 302 and the output of gate 61 is inverted by gate 71 and applied to electrode lead 303. In similar fashion, the output of gate 62 is applied directly to electrode lead 304, and the inverted output of gate 72 is applied to electrode lead 305. The waveforms corresponding to the signals applied to electrode leads 302-305 are illustrated on lines I, J, K and L of FIG. 2, respectively.

The outputs applied to electrode leads 314–317 are generated in response to enabling signals from the fifth output of counter 18 and are illustrated on lines N, O, P and Q of FIG. 2.

It should be apparent that a burst of four pulses is applied to each electrode of the EEG system. The bursts of pulses to adjacent electrodes are applied at the same instant, but are of inverted amplitude with respect to each other so that two open electrodes connected to the same amplifier will not result in cancellation of the test signals due to common mode rejection characteristics of the EEG amplifiers.

Subsequent test signals are then applied to the next group of four electrode leads at a slightly delayed time, determined by counter 18, and so on until each of the electrodes has received a four pulse burst. Upon completion of one complete counting cycle, counter 15 and counter 18 are recycled and the repetition of signals is repeated to each of the electrodes, so long as the patient recording run is carried out.

Figure 3:
FIG. 3 is a diagrammatic chart illustrating various recorded waveforms of the type received from an EEG used in conjunction with the open lead test system of FIG. 1 and having open leads.
Figure 3:
Figure 3:

During and upon completion of the patient run, the recording is available for examination by medical personnel and any open leads can be detected by the occurrence of distinctive recording outputs such as are illustrated in FIG. 3. The signal amplitude of the 25 Hz pulse burst is selected to be sufficiently small that the voltage developed across an electrode of normal impedance is below the noise level of the EEG amplifier, but large enough so that an open electrode produces a clear indication on the recorded chart. Although other test signals of different configuration could be utilized, it has been found that the use of a four-pulse burst signal is particularly useful since it is unlikely to be mistaken for a naturally occurring output obtained during a normal EEG run. Thus, the EEG signal can contain frequencies anywhere within a recording range of the pen motors so that a fixed frequency waveform or a single pulse could easily be confused with a standard EEG recording. Furthermore, EEG recordings are frequently filtered at the high and low end of the frequency range, thus severely limiting the type of test signal which can be effectively used.

The circuit described herein results in a highly reliable, useful test configuration for ensuring that open leads do not occur in an EEG run. Consequently, the reliability of the EEG system is greatly enhanced.

What is claimed is:

1. A test system for identifying open circuit electrodes of a multi-electrode EEG system during patient testing comprising
    pulse generating means for producing an alternating electrical signal,
    counter means responsive to the alternating electrical signal for producing first and second pulse signals,
    logic ciruit means responsive to said first and second pulse signals for selectively producing a plurality of identical test signals each corresponding to a different EEG electrode, said test signals occurring at different times within a predetermined test sequence, and
    circuit means for conducting each test signal to said corresponding EEG electrode.

2. A test system as described in claim 1 wherein said counter means include binary counter means for producing said first pulse signal and decade counter means for producing said second pulse signal, with said first pulse signal having a repetition rate higher than said second pulse signal, and wherein said logic circuit means comprise selectively operable gate means connected to said binary counter means and said decade counter means for producing a plurality of test signals each comprising a burst of pulses of predetermined frequency and amplitude.

3. The test system of claim 2 further including means for maintaining the amplitude of pulses from said gate means at a level sufficiently low that said test signals are lower than the signal-to-noise ratio of the amplifier of the EEG system whereby the test signal remains undetected in the output of the EEG system unless an open circuit condition occurs therein.

4. A test system for identifying open circuit electrodes within a multi-electrode EEG system during patient use comprising
    pulse generating means for producing an alternating electrical signal,
    first counter means connected to said pulse generating means for producing first and second pulse signals,
    logic circuit means responsive to said first and second pulse signals for producing corresponding sets of test signals of identical form, said first and second sets of test signals comprising bursts of pulses of predetermined frequency, with the bursts of the first set of said signals occurring at a different time than the bursts of pulses within said second set,
    decade counter means connected to said binary counter means for producing sequencing pulse signals, and second logic circuit means responsive to said first and second sets of test signals and said sequencing signals for producing a plurality of bursts of test signals of identical form, with each burst of signals corresponding to a different EEG electrode and occurring at a different time within a predetermined test sequence, and
    circuit means for conducting each burst of signals to said corresponding EEG electrode.

5. The test system of claim 4 wherein said second logic circuit means produce a first plurality of test signals of positive amplitude and a second plurality of test signals of negative amplitude whereby test signals applied at the same time to adjacent electrodes of the EEG system are not canceled due to the common mode rejection characteristics of the EEG amplifiers.

* * * * *